J. H. ABBOTT.
MOUTH PROP.
APPLICATION FILED MAR. 21, 1912.
1,067,572.
Patented July 15, 1913.
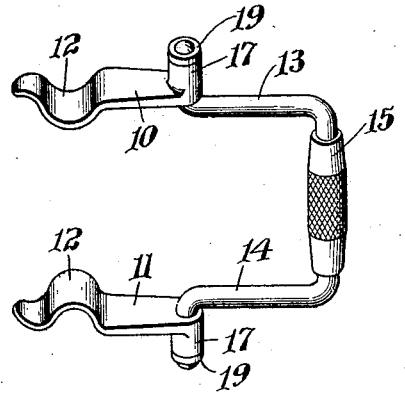
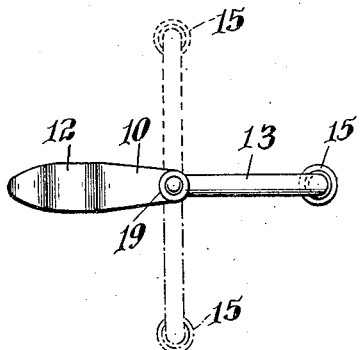
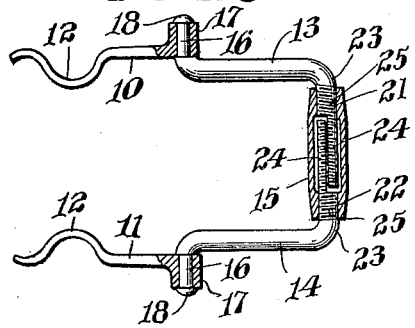
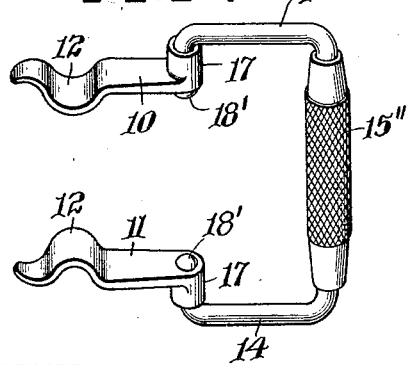
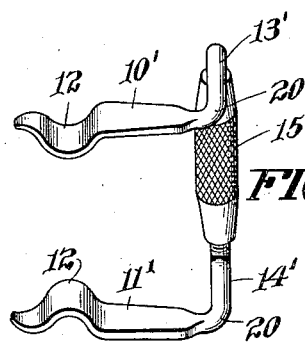
WITNESSES
Daniel Webster Jr.
William Conway
INVENTOR
James Herman Abbott
BY Wm Steell Jackson
ATTORNEY

UNITED STATES PATENT OFFICE.

JAMES HERMAN ABBOTT, OF PHILADELPHIA, PENNSYLVANIA.

MOUTH-PROP.

1,067,572.  Specification of Letters Patent.  Patented July 15, 1913.

Application filed March 21, 1912. Serial No. 685,164.

*To all whom it may concern:*

Be it known that I, JAMES HERMAN ABBOTT, a citizen of the United States, and a resident of Philadelphia, Pennsylvania, have invented a certain new and useful Mouth-Prop, of which the following is a specification.

The purpose of my invention is to prevent undue lateral swinging of the adjusting arms in a mouth prop.

A further purpose of my invention is to provide for the movement of the connecting or middle portion of a mouth prop from side to side while the prop is in place, in order that different portions of the mouth may be accessible for treatment.

Further purposes will appear from the specification and the claims appended thereto.

I have preferred to illustrate my invention by forms thereof which have proved practical and efficient, which are readily constructed and conveniently operated and which at the same time present the principles of my invention to excellent advantage.

Figure 1 is a perspective view of one form of my invention. Fig. 2 is an end elevation of the structure of Fig. with possible positions shown in dotted lines. Fig. 3 is an elevation, partly in section, showing one of the possible forms of the structure illustrated in Fig. 1. Fig. 4 is a perspective view of a form of my invention in some respects preferred to that of Fig. 1. Fig. 5 is a perspective view of a modified form of my invention.

In the drawings the same numerals of reference indicate like parts.

I desire it to be understood that my description of the structure shown does not in any way indicate that these exact structures are necessary to the practice of my invention, as many, if not all, the benefits of my invention may be attained by other structure.

Considering first the structure of Fig. 1, I show arms 10 and 11 terminating in hook members 12 for engagement with the jaws or teeth of the patient, when dental or surgical mouth operations are to be performed. These members 12 may be used as shown or suitably covered according to the circumstances of the particular case. I prefer to pivot these arms to arms 13 and 14, by which the adjustment is effected through preferably knurled right and left nut 15, in order that the various positions of the arms 13 and 14 and nut 15, seen in Fig. 2, may be attained, as also any intermediate desired positions. This swinging of the portion here represented by 13, 14 and 15 is quite desirable where access to different parts of the mouth is desired with one setting of the prop, as it avoids necessity for removal of the prop and also affords variant angular positions as desired. I show one form of this pivoting in Figs. 1-3, where the arms 13 and 14 are outwardly turned at 16 to provide pintles or pivots upon which sleeves 17 are adapted to turn. The sleeves 17 are preferably integral with the arms 10 and 11. The ends of the pintles 16 are conveniently shown as riveted at 18 to retain the sleeves 17 in place, with or without the interposition of washers 19. I thus form a convenient and inexpensive type of pivotal joint between the parts, which may, of course, be greatly varied.

In the form shown in Fig. 4, preferred by me because it gives greater freedom of access to the mouth of the patient, I have illustrated a similar pivotal joint except that the arms terminating in rivets 18 are turned inwardly instead of outwardly, the construction and operation being permissibly the same in every other particular.

In the form shown in Fig. 5, I do not provide for pivotal connection between the parts 10′, 11′ and the parts 13′, 14′, making them integrally connected by a preferably nearly right angular turn at 20, which permits of location of the nut or bar 15 at either side of the mouth, by reversing the positions of the arms in the mouth. This is open to the objection of requiring removal and re-insertion, which is avoided in my preferred form.

In Fig. 3 I thread a part only of the nut as at 21 and 22, threading these oppositely, right and left, and cut away a portion of each of the right angular extensions 23 of the connecting arms 13 and 14, as at 24, so that they can pass each other within the nut. I prefer to cut away a little more than half, diametrically, of each of these extensions, so that slight relative circumferential movement of the portions 24 may be permitted before they lock against each other. This permits slight relative swinging of the arms 13 and 14, to accommodate variations in the position and formation of the upper and lower jaws or teeth of the patient. The length of the threaded portion of the nut at 21, 22 is just sufficient to properly engage the full threaded portions 25 of the extensions 23 and to continue to engage with an operative length of these fully threaded portions during the necessary adjustment of the prop. More room for this nut engagement, than in the form shown in Figs. 1–3, with a fully threaded part 25, is offered in the form shown in Fig. 4, rendering the structure of Fig. 4 more suitable for use where large props, or considerable extension is required.

I recognize that other forms of pivotal construction may be used where this feature of my invention is desired and that various connections controlling the relative positions of the arms 13 and 14, lie within the skill of the ordinary mechanic, both within the scope of my claims herein. In all of my pivotal forms I place the pivot points outside of the mouth of the patient.

Having thus described my invention, what I claim as new and desire to secure by Letters Patent is:—

1. In a device of the character stated, arms and connections adapted to pass within the mouth of the patient and terminating in oppositely directed threaded extensions, adjusting means engaging both extensions and means upon the extensions for preventing undue angular movement of one extension with respect to the other.

2. In a mouth prop, an adjusting nut, a pair of threaded rods engaged thereby and having portions removed so that the remaining portions pass longitudinally and may angularly engage each other and connections from said rods adapted to enter the mouth of the patient.

JAMES HERMAN ABBOTT.

Witnesses:
WM. STEELL JACKSON,
HELEN I. KAUFFMAN.

Copies of this patent may be obtained for five cents each, by addressing the "Commissioner of Patents, Washington, D. C."